(12) United States Patent
Hartmann et al.

(10) Patent No.: US 9,764,290 B2
(45) Date of Patent: Sep. 19, 2017

(54) DEGASSING AND DE-BUBBLING PULSE DAMPENER

(71) Applicant: IDEX Health & Science LLC, Middleboro, MA (US)

(72) Inventors: Daniel M. Hartmann, Middleboro, MA (US); Carl Sims, Rohnert Park, CA (US); David Steckman, Oak Harbor, WA (US); Leanne Elson, Oak Harbor, WA (US)

(73) Assignee: IDEX Health & Science LLC, Middleboro, MA (US)

( * ) Notice: Subject to any disclaimer, the term of this patent is extended or adjusted under 35 U.S.C. 154(b) by 68 days.

(21) Appl. No.: 14/684,219

(22) Filed: Apr. 10, 2015

(65) Prior Publication Data

US 2016/0296858 A1 Oct. 13, 2016

(51) Int. Cl.
*B01D 19/00* (2006.01)
*B01D 69/10* (2006.01)
*B01D 63/00* (2006.01)
*B01D 71/36* (2006.01)
*B01D 63/08* (2006.01)

(52) U.S. Cl.
CPC ......... *B01D 63/08* (2013.01); *B01D 19/0031* (2013.01); *B01D 19/0078* (2013.01); *B01D 63/00* (2013.01); *B01D 69/10* (2013.01); *B01D 2313/20* (2013.01)

(58) Field of Classification Search
CPC ............ B01D 19/0031; B01D 19/0068; B01D 19/0073; B01D 63/00; B01D 69/10; B01D 2319/02; B01D 2319/04; B01D 63/08
See application file for complete search history.

(56) References Cited

U.S. PATENT DOCUMENTS

| 3,741,692 | A | | 6/1973 | Rupp | |
|---|---|---|---|---|---|
| 4,163,461 | A | * | 8/1979 | Jacobellis | F16L 55/053 138/30 |
| 4,222,414 | A | | 9/1980 | Achener | |
| 4,234,427 | A | | 11/1980 | Boehme | |
| 4,336,036 | A | * | 6/1982 | Leeke | B01D 19/0031 210/94 |
| 4,548,240 | A | | 10/1985 | Graham | |
| 4,552,182 | A | | 11/1985 | Graham | |
| 4,556,087 | A | | 12/1985 | Casilli | |
| 4,629,562 | A | | 12/1986 | Kercher | |
| 5,472,600 | A | | 12/1995 | Ellefson | |
| 5,651,931 | A | | 7/1997 | Bailey et al. | |
| 5,797,430 | A | | 8/1998 | Becke | |

(Continued)

*Primary Examiner* — Jason M Greene
(74) *Attorney, Agent, or Firm* — Vinson & Elkins LLP

(57) ABSTRACT

A device which includes a pulse dampener and a degasser or de-bubbler. The device includes a fluid flow path and a fluid chamber located within the device. In addition, the device includes a pulse dampening membrane for dampening pulses in the fluid as it flows through the device. The device also includes a degassing membrane for degassing the fluid as it flows through the device, and/or a de-bubbling membrane for removing gas bubbles from the fluid as it flows through the device. The degassing or de-bubbling membrane can be separate and distinct from the dampening membrane. The de-bubbling membrane can be in addition to or in place of the degassing membrane in some embodiments.

18 Claims, 5 Drawing Sheets

(56) References Cited

U.S. PATENT DOCUMENTS

| | | | |
|---|---|---|---|
| 5,851,390 A * | 12/1998 | Lemonnier | B01D 63/087 210/321.75 |
| 5,904,181 A | 5/1999 | Tooma et al. | |
| 5,980,742 A * | 11/1999 | Saitoh | B01D 19/0031 210/186 |
| 6,942,718 B1 * | 9/2005 | Schmidt | B01D 19/0031 95/241 |
| 2001/0007062 A1 | 7/2001 | Dumaresq-Lucas et al. | |
| 2002/0056675 A1 * | 5/2002 | Hegde | B01D 19/0031 210/188 |
| 2007/0095204 A1 * | 5/2007 | Gerner | B01D 19/0031 95/46 |
| 2007/0295663 A1 | 12/2007 | Iraneta et al. | |
| 2008/0257835 A1 | 10/2008 | Benevides et al. | |
| 2009/0001019 A1 * | 1/2009 | Frometa | B01D 19/0031 210/637 |
| 2010/0126921 A1 | 5/2010 | Rahn | |
| 2010/0218679 A1 * | 9/2010 | Hekmat | B01D 19/0031 96/6 |
| 2011/0067485 A1 * | 3/2011 | Grant | B01D 65/102 73/38 |
| 2014/0090557 A1 * | 4/2014 | Gottlieb | B01D 19/0031 95/46 |
| 2015/0209783 A1 * | 7/2015 | Ingber | B01D 19/0031 435/297.1 |
| 2016/0038940 A1 * | 2/2016 | Babcock | B81C 1/00206 422/68.1 |

* cited by examiner

DEGASSING AND DE-BUBBLING PULSE DAMPENER

CROSS-REFERENCE TO RELATED APPLICATIONS

N/A

FIELD OF THE INVENTION

The present disclosure relates generally to devices for dampening fluid pulses, and degassing and de-bubbling devices for removing unwanted gases and/or bubbles, in fluid systems such as analytical instrument systems, and, more specifically, to devices which can dampen fluid pulses and also remove one or more gasses and/or remove bubbles from a fluid, and methods and apparatus relating to the same.

BACKGROUND OF THE INVENTION

It is known that pressure variations or pulses may occur when fluids are pumped through conduits. These pressure variations and the resulting mechanical vibrations can disrupt the constant flow of the fluid and cause damage and wear to the pipes and connections. Moreover, such pressure variations can disrupt or ruin downstream applications, which may depend on smooth, steady flow for their proper function. To address these problems, pulse dampeners have been developed to reduce or eliminate pulsations and vibrations in the fluids as they are pumped through pressurized systems.

Applications for pulse dampeners include, for example, liquid chromatography, where pulses in fluid flow can obscure chromatographic analysis, as well as in other applications such as other analytical instrument systems, including flow cytometry, urinalysis and hematology analyzers, chemical analysis systems, flow cells used in molecular analysis, and other applications in which concentration is measured as a function of time.

Conventional pulse dampening systems exist, and take a variety of forms. One such method uses air and air pressure to try to counteract and compensate for the pressure exerted by a pressurized fluid moving through the dampener. Conventional pulse dampeners or surge suppressors that do not use elastic membranes have incorporated air chambers such that the fluid being pumped through the conduit is allowed to compress the air in the air chamber and occupy a greater proportion of the volume of the chamber as the fluid pressure increases. When the fluid pressure decreases, the air in the chamber expands and returns some of the fluid from the chamber to the conduit system. A problem with the above approach using one or more air chambers that communicate with the fluid channel, however, is that some of the air will likely dissolve into the fluid being pumped, thereby reducing the volume of air in the chamber and potentially affecting the composition of the fluid being pumped.

An alternative approach that reduces this problem is to use a dampening membrane which separates the fluid being pumped through the conduit system from an air chamber used to compensate for the fluid pressure. In such systems, the fluid exerts pressure on the membrane, causing it to expand toward the air pressure chamber, and the air in the chamber pushes back on the membrane to compensate for that pressure and membrane displacement. Conventional pulse dampeners that use this method may use a closed air chamber with a static amount of air. However, experience teaches that just about every membrane is at least somewhat gas-permeable—particularly when the membrane is thin, as is often desired to achieve good dampening performance. Thus, this approach often results in the loss of air from the air chamber, and the undesirable gasification of the liquid being pumped.

An alternative to using an air-filled chamber to provide the restoring force on the liquid, is to use alternative means, such as a compressible liquid, a spring, or a thick, but squishy piece of rubber or foam. An example of such a device is that disclosed in U.S. Pat. No. 4,629,562, titled "Pulse Dampener" and issued to Kercher on Dec. 16, 1986. The Kercher patent explains that a pulse dampener may be used in a liquid chromatography system and teaches the use of a chemically inert diaphragm and a unitized plug which has two portions, each of which has different compressibility characteristics. However, in such a device, gasses may still find their way into the liquid through leaks in the system, by incomplete priming of the device, or by introduction of air bubbles into the fluid flow itself. Once introduced into such a dampener, such air-bubbles can be extremely hard to remove, and they influence the performance of the dampener in unpredictable ways.

Another example can be found in U.S. Pat. No. 4,548,240, titled "Hydraulic Pulse Dampener and Employing Stiff Diaphragm and Nesting Member," and issued to Graham on Oct. 22, 1985. Graham teaches an example of a hydraulic pulse dampener which uses liquid to dampen pulses in a relatively high-pressure environment. However, Graham does not provide for any degassing capability. Likewise, U.S. Pat. No. 4,222,414, titled "Pulse Dampener for High Pressure Liquid Chromatography," and issued to Achener on Sep. 16, 1980, and U.S. Pat. No. 4,234,427, titled "Pulse Dampener," and issued to Boehme on Nov. 18, 1980, both disclose hydraulic pulse dampeners for use in relatively high-pressure environments, but the apparatus disclosed in both Achener and Graham lack any degassing or de-bubbling capabilities.

Air bubbles trapped in a dampener can result in several undesirable consequences. First, the presence of bubbles can affect the dampening power of the pulse dampener. The dampening power of the pulse dampener can vary in direct proportion to the varying size of the bubbles generated by or introduced into the system, and therefore the system may not uniformly dampen fluid pulses. In such situations, the dampening ability may be variable and unpredictable. Second, bubbles may unintentionally exit the pulse dampening system and travel downstream in the system. In some applications, such as liquid chromatography, the presence of bubbles in the fluid stream is undesirable. Third, gas bubbles trapped in a fluid pulse dampening system may cause gas buildups within the system, thereby reducing the ability to cleanly and fully sweep a fluid through the system.

The problem of dissolved gas or bubbles within pulse dampening systems has met with some efforts at resolution, but these results and approaches have several drawbacks and limitations. For example, U.S. Pat. No. 5,904,181, titled "Pulse Dampening Device," and issued to Tooma et al. on May 18, 1999, discloses a pulsation dampening device with a horizontal shape and with fluid inlet and outlet ports configured so as to minimize air bubbles from becoming trapped within a fluid. However, Tooma et al. fails to disclose or provide a system for extracting air bubbles that do become trapped.

Similarly, U.S. Pat. No. 6,675,835, titled "Elliptical Tubing in Degassing and Pulsation Damper Application," issued to Gerner et al. on Jan. 13, 2004 discloses a flow-dampening and degassing apparatus which uses a gas-permeable, non-porous, elliptical-shaped tube disposed within a vacuum chamber. Besides the cost and complexity of requiring a vacuum chamber, Gerner et al. has the further limitation of having a membrane which must perform both the dampening and degassing functions. Thus, the functions of the two membranes cannot be separately optimized to account for different types of fluid by, for example, the use of different materials, shapes, or sizes for the membranes.

Likewise, U.S. published patent application No. 2003/0041911, titled "Burdoin (sic) Tubing in Degassing and Pulse Dampener Applications," filed on behalf of Gerner et al., discusses integrating a degasser function and a dampening function, but do so using a Bourdon tube as the dampening element and thus require a more complex dampening system. In addition, because the degassing tube and the dampening tube in the Gerner et al. patent application are one-and-the-same, one cannot independently optimize the dampening characteristics and the degassing characteristics.

The foregoing U.S. patents with U.S. Pat. Nos. 4,548,240, 4,222,414, 4,234,427, 5,904,181, and 6,675,835, and U.S. published patent application No. 2003/0041911, are hereby incorporated by reference as if fully set forth herein.

The use of both a conventional pulse dampener and a conventional degasser or de-bubbler in a given system remains a possibility, but also involves limitations and drawbacks. For example, such an approach involves the use of two separate components in a system, thus making the system more complex, and introducing more internal volume into the system. Moreover, this approach involves the use of more fluid connections (and thus more work for an operator and greater chance for leaks) and also additional costs due to the use of two components.

SUMMARY OF THE INVENTION

In one embodiment of the present disclosure, a device is provided which has a body having a first side and a second side, wherein the first side has a first port and the second side has a second port, and wherein said body has a chamber therein, wherein the chamber is in fluid communication with the first port and the second port, with the device further having a dampening membrane, wherein at least a first portion of said dampening membrane defines a top portion of the chamber in said body and at least a second portion of said dampening membrane is sealingly secured to said body, and said device further has a degassing membrane, wherein at least a first portion of said degassing membrane defines a bottom portion of the chamber in said body and at least a second portion of said degassing membrane is sealingly secured to said body. The chamber may comprise a variety of shapes, including shapes comprising a hemispherical shape, a cylindrical shape, or other shapes. The body of the device may comprise a thermoplastic material, a metal material, or a ceramic material, or may comprise a combination of two or more of such materials. The device in accordance with some embodiments may include a dampening membrane which comprises one or more materials selected from the group consisting of: silicone rubber, thermoplastic vulcanizate (e.g., SANTOPRENE), fluoropolymer elastomer (e.g., VITON), perfluoroelastomer (e.g., KALREZ), biocompatible materials (e.g., PHARMED), polyurethane, rubber, neoprene, and ethylene propylene diene monomer rubber. The degassing membrane in one or more embodiments may comprise a substantially non-porous material, or may comprise a substantially porous material. The degassing membrane in one or more embodiments may comprise one or more materials selected from the group consisting of: silicone rubber, polytetrafluoroethylene (e.g., TEFLON AF200), and fibrillated polymers. In one embodiment, the device further comprises a porous support, wherein at least a portion of said support is located between said degassing membrane and a bottom side of said body. In another embodiment, the body of the device further comprises a top body portion and a bottom body portion, and wherein said top body portion and said bottom body portion are secured together. The device may further comprise a lid located within a cavity in said body above at least a portion of said dampening membrane, wherein said lid comprises a spherically-shaped lower surface portion facing a portion of said dampening membrane. In this particular embodiment, the lid may comprise at least one vent providing fluid communication between the cavity above said dampening membrane and an exterior portion of said body. In certain embodiments, either or both of the dampening and the degassing membranes maintain a sealed connection to said body when the pressure of a fluid in the chamber is less than or equal to 10 psi, 20 psi, 30 psi, 40 psi, 50 psi, 60 psi, 70 psi, 80 psi, 90 psi, and/or 100 psi or so.

In another embodiment of the present disclosure, a device is shown and described as having a body having a first side and a second side, wherein the first side has a first port and the second side has a second port, and wherein said body has a chamber therein, wherein the chamber is in fluid communication with the first port and the second port, with the device having a dampening membrane, wherein at least a first portion of said dampening membrane defines a top portion of the chamber in said body and at least a second portion of said dampening membrane is sealingly secured to said body, and the device further having a de-bubbling membrane, wherein at least a first portion of said de-bubbling membrane defines a bottom portion of the chamber in said body and at least a second portion of said de-bubbling membrane is sealingly secured to said body. The de-bubbling membrane may comprise one or more materials selected from the group consisting of: polytetrafluoroethylene (e.g., TEFLON), and fibrillated polypropylene.

In another embodiment of the present disclosure, a device may comprise a body having a first side and a second side, wherein the first side has a first port and the second side has a second port, and wherein said body has a chamber therein, wherein the chamber is in fluid communication with the first port and the second port, with the device further having a first membrane, wherein at least a first portion of said first membrane defines a top portion of the chamber in said body and at least a second portion of said first membrane is sealingly secured to said body, and the device also having a second membrane, wherein at least a first portion of said second membrane defines a bottom portion of the chamber in said body and at least a second portion of said second membrane is sealingly secured to said body. In one embodiment, the first membrane may comprise a pulse dampening membrane. In yet another embodiment, the second membrane may comprise a degassing or de-bubbling membrane.

Briefly stated, these and numerous other features, objects and advantages of the present disclosure will become readily apparent upon a reading of the detailed description, claims and the drawings set forth herein. These features, objects and advantages are generally accomplished by providing a device having a dampening and degassing chamber of a certain shape and by having a fluid input port and a fluid output port positioned relative to the dampening and degassing chamber in a way that helps maximize the dampening power of the dampening membrane, minimize the volume of the dampening and degassing chamber, maximize the surface area of the degassing membrane, and maximize the ability to sweep fluids out of the dampening device, all while providing a device that is easy to use because it does not require extra connections and also tends to be less expensive because it requires less components and is easier, faster, and cheaper to manufacture.

DETAILED DESCRIPTION

Figure 1:
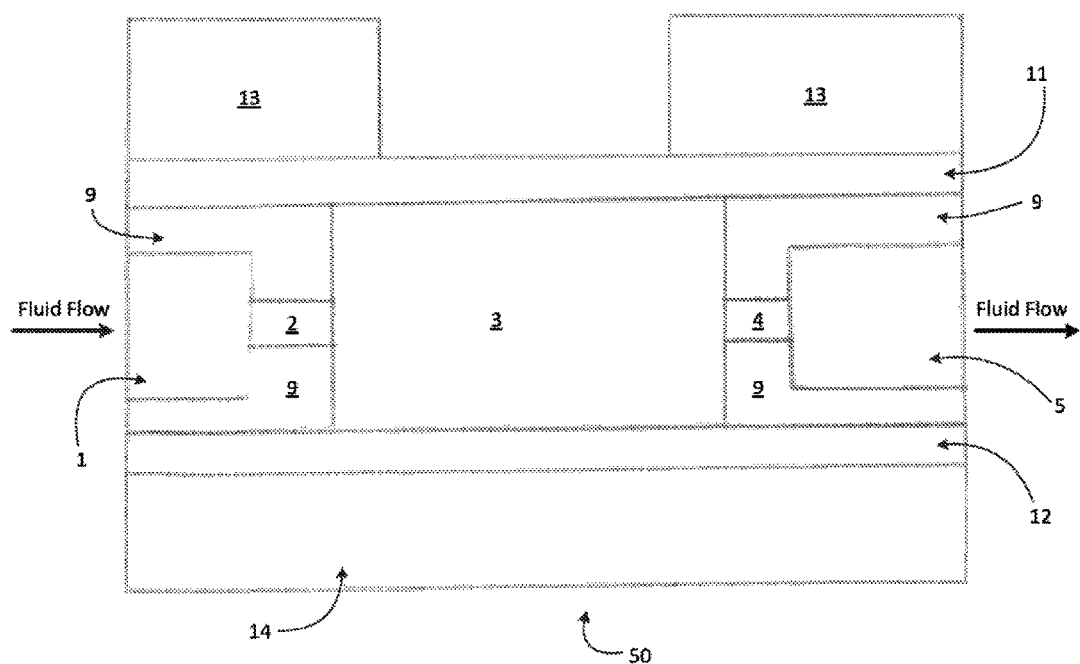
FIG. 1 is a cross-sectional side view of a dampening and degassing device in accordance with an embodiment of the present disclosure.

Referring first to FIG. 1, pulse dampening and degassing device 50 is shown. As a fluid flows in the direction of the arrows shown in FIG. 1 and through said device 50, device 50 dampens fluid pulses with a membrane 11 that expands and contracts in relation to the increases and decreases in fluid pressure (e.g., the pulses in the fluid).

Device 50 may be embodied in a variety of configurations, and is illustrated in FIG. 1 as a representative simplified embodiment. Device 50 includes a fluid input port 1 and a fluid output port 5, which are connected by fluid channels 2, 4. Located between the fluid channels 2, 4 is a dampening and degassing chamber 3. As shown in FIG. 1, the dampening and degassing chamber 3 is also located between and partially defined by a dampening membrane 11 and a degassing membrane 12. In FIG. 1, the dampening membrane 11 and degassing membrane 12 extend the length of the dampening and degassing chamber 3. As shown in FIG. 1, dampening membrane 11 defines the top boundary of the dampening and degassing chamber 3. To prevent fluid from leaking out of the chamber 3, the dampening membrane 11 is secured to one side of the body 9 of the dampening device 50 by a top cover 13. Degassing membrane 12 defines the bottom boundary of the dampening and degassing chamber 3 as shown in FIG. 1. To prevent fluid from leaking out of the chamber 3, the degassing membrane 12 is secured to the dampening device 50 by a bottom cover 14. A fluid flows through the fluid input port 1, fluid channel 2, through the dampening and degassing chamber 3, fluid channel 4, and the fluid output port 5 in the direction of the arrows shown in FIG. 1.

Although not shown, it will be understood by those of skill in the art that tubing or other fluid conveyance means may be attached to the inlet port 1 and to the outlet port 5 of the device 50, and may be sealingly attached to ports 1 and 5 by conventional means, such as a fitting assembly consisting of tubing, a nut and a ferrule or the like. Those skilled in the art will also appreciate that the selection of the tubing, nut and ferrule or other fitting assembly or connection means may be chosen based on the intended application of the device 50, such as those involving corrosive chemicals as the fluid, those involving high or low pressures of the fluid, those involving high or low flow rates for the fluid, and the like. As further described below, it will be appreciated that one of the advantages of the device 50 is that it can be adapted and used in a wide variety of applications.

Figure 2:
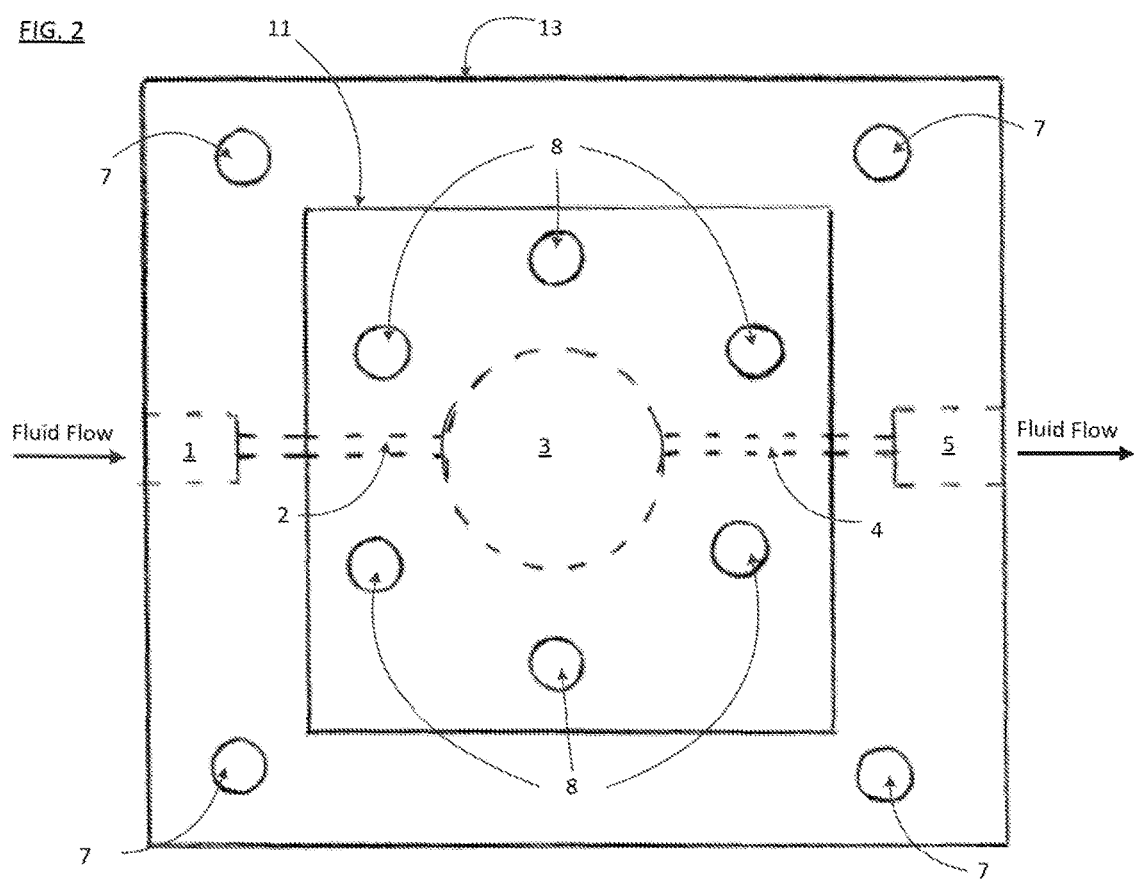
FIG. 2 is a top view of the device of FIG. 1.

A top view of the device 50 is illustrated in FIG. 2. Generally, the same numerals are used in the Figures throughout this disclosure to indicate the same features, although the Figures may show alternative embodiments. The interior features of the dampening device 50—namely the fluid inlet port 1, fluid channels 2, 4, dampening and degassing chamber 3, and fluid outlet port 5—are enclosed within the device 50 by the body 9 and may not be visible from a top view of said device 50. If, however, device 50 comprises a transparent or translucent top cover 13, additional details in body 9 can be visible. Device 50 may include a plurality of mounting holes 7, which can be provided to allow the dampening device 50 to be mounted in various orientations and to a variety of devices (not shown in FIG. 2). For example, the device 50 may be mounted and secured to a liquid chromatography device by nuts, bolts, or screws located in one or more of holes 7. Device 50 may further include a plurality of bolt holes 8, which are provided to help secure the components of the device 50 together. In one embodiment, these bolt holes 8 may be in a circular configuration, as shown in FIG. 2. In another embodiment, these bolt holes 8 may be in an elliptical or other configuration. The configuration of the bolt holes may be varied depending on the shape of the dampening and degassing chamber 3 in a particular embodiment. Although referred to herein as bolt holes 8, it will be understood that the holes 8 can be used with other attaching means, such as nuts or screws. Moreover, it will be understood and appreciated that body 9, top cover 13, and bottom cover 14 can be secured together by other securing means, such as by adhesives, glues, resins, clamps, and so forth.

Figure 5A:
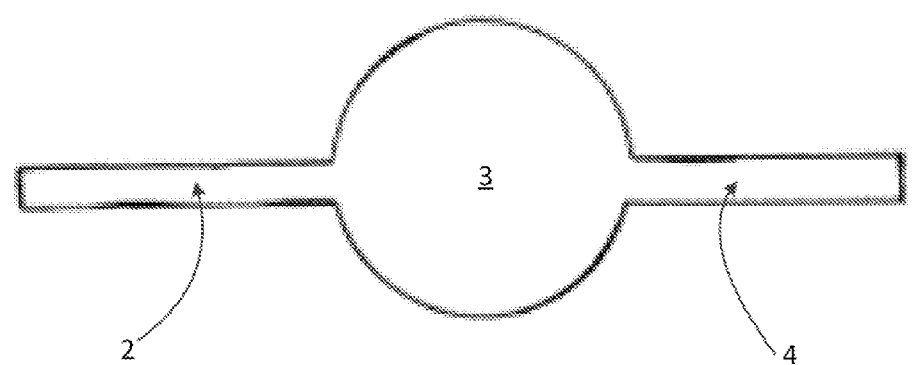
FIGS. 5A, 5B, and 5C are top views of alternative embodiments of a chamber in a device in accordance with the present disclosure.

The dampening and degassing chamber 3 may be fabricated with any desired shape. In one embodiment, the shape of the chamber when viewed from above in a planar view may have a substantially circular shape, as shown in FIG. 5A. A circular shape maximizes the ratio of the dampening power of the device 50—a function of the smallest unsupported dimension of the dampening membrane 11—to the internal volume of the dampening and degassing chamber 3. However, experience has shown that it can be difficult to completely sweep fluid through a circular chamber. Such sweeping may be desirable, for example, when changing the type of fluid being passed through the dampening and degassing chamber 3 in repeated use of the device 50. Failure to fully sweep fluid out of said chamber 3 may leave behind carryover fluid from a prior use that may contaminate or otherwise affect the next use.

Figure 5B:
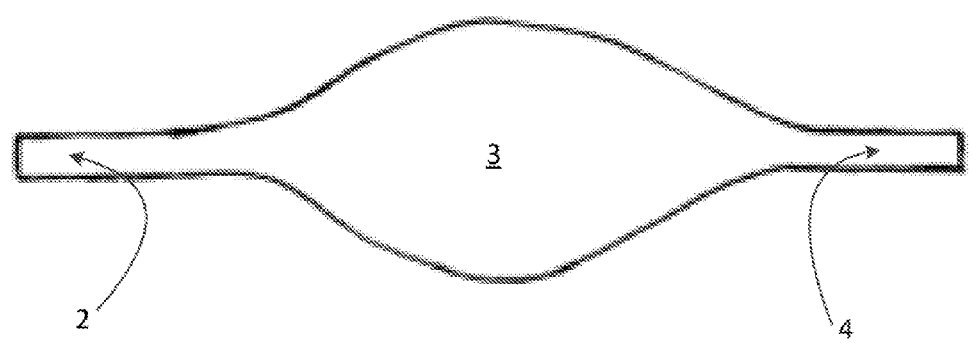
Figure 5C:
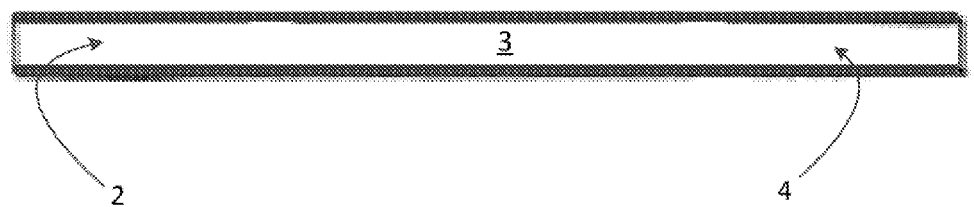

An alternative embodiment has a chamber that when viewed from above in a planar view, constitutes a long, tortuous-shape. (such as is shown in FIG. 5C). Although shown in FIG. 5C as a substantially straight flow path, a tortuous path can be serpentine or diagonal in shape, or may include portions that are straight, serpentine from a longitudinal axis, diagonal from the longitudinal axis, and the like. Such a shape for chamber 3 can be swept very cleanly, but provides extremely limited dampening capabilities, relative to a circular chamber.

Between these two extremes, there exist any number of chamber shapes that may be fabricated, with a desire to maximize dampening performance, reduce chamber internal volume, and enable clean fluid exchange. In general, there is a trade-off between the dampening performance-to-internal volume ratio, and the ability to sweep the fluid path. A compromise between these desires may therefore be the best solution. As one example, in another embodiment, an eye-shaped dampening and degassing chamber 3 (such as is shown in FIG. 5B) may be used. Such shapes as a lens or vesica piscis, or variations on either, may be considered substantially eye-shaped for purposes of this disclosure. An eye-shaped chamber 3 may be advantageous because it may in some applications provide good dampening performance, while at the same time provide better sweeping capabilities than a circular shape.

It will be understood by those skilled in the art that other shapes are also possible for chamber 3.

Figure 3:
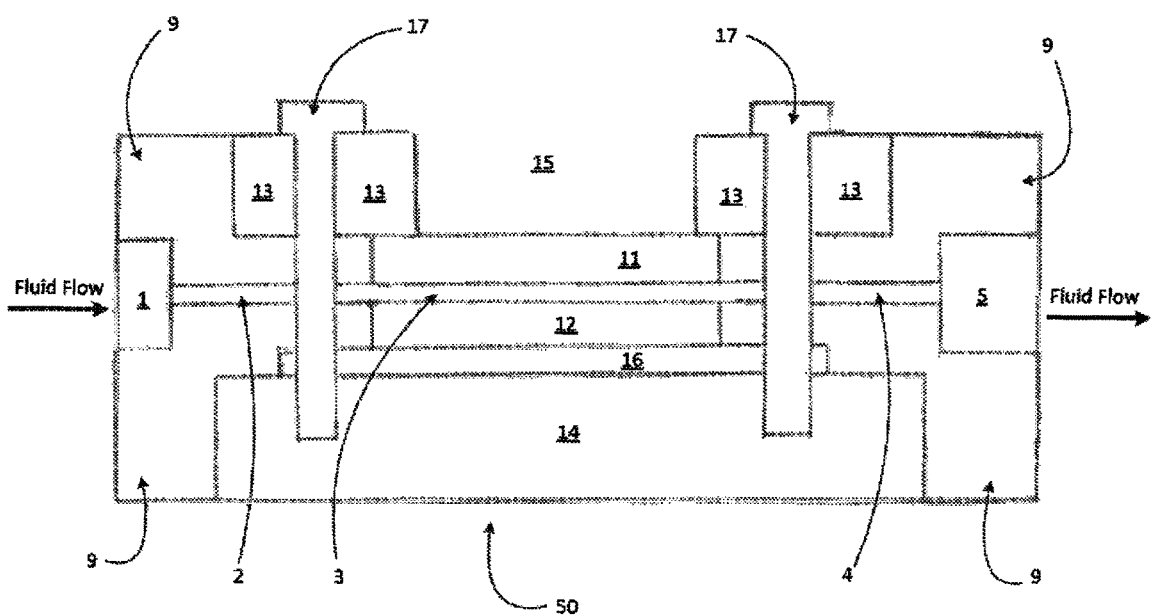
FIG. 3 is a cross-sectional side view in accordance with an embodiment of the present disclosure.

FIG. 3 shows a detailed cross-sectional view of another embodiment of the device 50. The components of the device 50 shown in FIG. 3 may be embodied in a variety of configurations, only one of which is illustrated in FIG. 3. The fluid input port 1, fluid channels 2, 4, and the fluid output port 5 are formed in a body 9, and the body 9 may be made of any suitable material, which may be selected depending in part on the fluid to be used in one or more intended applications. The body 9 may be made of, for example, thermoplastics such as acrylic or polyetheretherketone (PEEK). Body 9 may be made of other materials, including other plastics, metals, or ceramics. For applications in which aqueous fluids are to be used, for example, body 9 may be made of an acrylic plastic. When fluids containing harsh or corrosive chemicals are used for the fluid, body 9 may be made of high-performance thermoplastics such as, for example, any one of the following: a cyclic-olefin-polymer, co-polymers, polysulfone, polyphenylsulfone, PEEK, or polytetrafluoroethylene (PTFE). When fluids are to be passed through the device 50 at high pressures, body 9 may be made of ceramic or metals such as, for example, stainless steel.

Dampening membrane 11 may be made of any material which deforms elastically in response to changes in fluid pressure. The material to be used for the dampening membrane 11 will vary depending on the range of expected fluid pressures and the chemical compatibility of the dampening membrane 11 material with the fluid to be used in one or more intended applications. Dampening membrane 11 may be made of, for example, silicone rubber, thermoplastic vulcanizate (e.g., SANTOPRENE), fluoropolymer elastomer (e.g., VITON), perfluoroelastomer (e.g., KALREZ), biocompatible materials (e.g., PHARMED), polyurethane, natural rubber, neoprene, and/or ethylene propylene diene monomer (EPDM) rubber. When fluids containing harsh or corrosive chemicals (e.g., fluids that are acidic or basic) are to be used for the fluid, dampening membrane 11 may be made of EPDM, fluoropolymer elastomer (e.g., VITON), perfluoroelastomer (e.g., KALREZ), biocompatible materials (e.g., PHARMED), or other rubber material appropriate for contact with the fluid(s) intended for one or more uses.

As shown in FIG. 3, screws 17 are threaded through the bolt holes 8, which securely attach the top cover 13, the bottom cover 14, and the body 9 together. In this embodiment, this secure attachment also holds the dampening membrane 11 in place and against the body 9, so that a fluid-tight seal at the top of the dampening and degassing chamber 3 is provided by membrane 11. Likewise, this assembly secures the degassing membrane 12 in place and against the body 9, so that a fluid-tight seal at the bottom of the dampening and degassing chamber 3. It will be understood that fluid-tight seals may also be created by placing gaskets (not shown in FIG. 3) between the dampening membrane 11 and the body 9, and/or between the degassing membrane 12 and the body 9. These gaskets may be made of, for example, TEFLON or silicone.

Degassing membrane 12 may be made of any one or more of a variety of non-porous, gas-permeable materials. Degassing membrane 12 may be made of, for example, silicone rubber or polytetrafluoroethylene (e.g., TEFLON AF2400). The material or materials used for the degassing membrane 12 can be selected based on knowledge of the likely expected fluid or fluids to be passed through the device 50 in one or more intended applications and the expected gas(es) contained in the fluid or fluids to be used and the corresponding permeability necessary for the degassing membrane 12 to better allow said gas(es) to flow out of the dampening and degassing chamber 3. It will be understood that the degassing membrane 12 may be a stand-alone membrane or may be a composite structure comprising multiple materials, such as a membrane—containing carbon nanotubes which is non-porous or a hydrophobic porous support structure. As an exemplary embodiment, the degassing membrane 12 may be made of an aerosol-applied non-porous, but highly permeable material, such as that described in expired U.S. Pat. No. 5,238,471 assigned to E.I. Du Pont De Nemours and Company, which is hereby incorporated by reference as if fully set forth herein. Said non-porous material such as TEFLON AF 2400 and other highly permeable non-porous polymers may be made by coating such permeable polymers onto a porous fibrillated polymer support structure 16 (e.g., polyvinylidene fluoride or polypropylene) as is shown in FIG. 3. In the embodiment shown in FIG. 3, a thin porous support structure 16 is located between the degassing membrane 12 and the bottom cover 14. Support structure 16 can allow gases to flow more freely through the degassing membrane 12. Support structure 16 may be made of, for example, a thermoplastic mesh, such as the woven PEEK material PEEKTEX, or any other porous substrate that can provide mechanical support to the degassing membrane while at the same time allowing gases to pass freely through it.

In another embodiment, the degassing membrane 12 can be a porous de-bubbling membrane instead of a non-porous membrane. Thus, in such an embodiment, the degassing membrane 12 can be referred to as a de-bubbling membrane. A de-bubbling membrane is more effective than a non-porous membrane at removing physical gas bubbles from a fluid. With a non-porous, de-bubbling membrane, gas bubbles can be removed from the fluid and move through the membrane by the solution-diffusion mechanism. However, with a porous de-bubbling membrane, gas bubbles can be removed from the fluid and move through the membrane pores through Knudsen diffusion. To achieve de-bubbling, the de-bubbling membrane may be made of, for example, fibrillated polytetrafluoroethylene (PTFE) TEFLON or fibrillated polypropylene. The type of material to be used for the de-bubbling membrane will usually depend on the expected type of fluid or fluids to be passed through the device 50 and the anticipated gas bubbles to be removed in one or more intended applications. It will be appreciated that porous materials which act through Knudsen diffusion must resist penetration through the pore structure by the fluid being debubbled. Mostly, these fluids are aqueous which may contain organic modifiers. The selection of the type of porous material can be determined using the bubble point method using well understood techniques such as ASTM F316-03 (2011) as applied to the target liquid or range of liquids. The performance of the de-bubbling membrane typically decreases for fluids with low surface tensions. Still referring to FIG. 3, the top cover 13 defines a cavity 15, which allows the dampening membrane 11 to extend upwards in response to increased fluid pressure within the dampening and degassing chamber 3.

Figure 4:
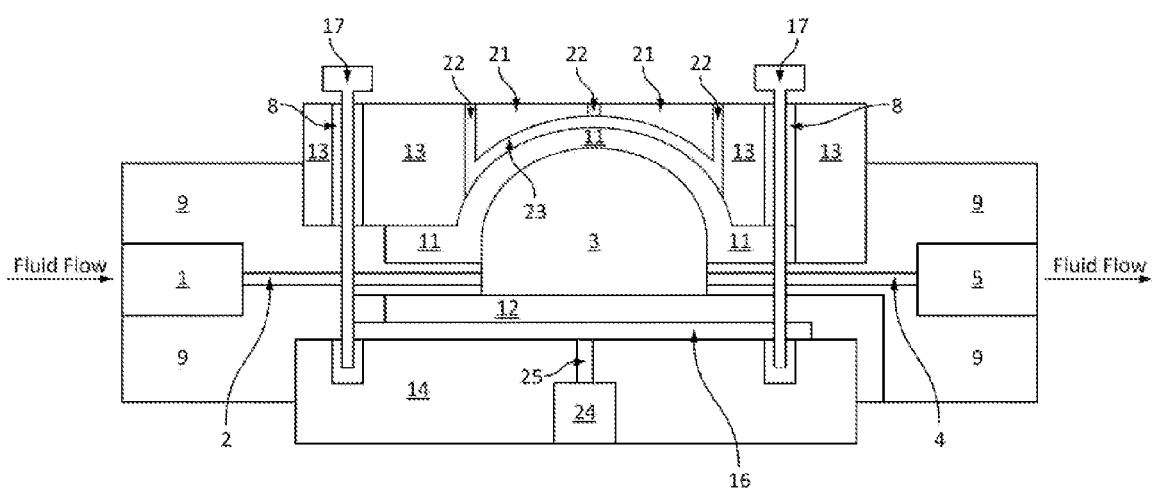
FIG. 4 is a cross-sectional side view of one embodiment of a device in accordance with another embodiment of the present disclosure.

In one embodiment, shown in FIG. 4, to prevent the dampening membrane 11 from extending upward to such a degree as to cause inelastic stretching or rupture of the membrane 11, a lid 21 can be placed above the dampening membrane 11 and in a cavity formed in the top cover 13. As shown in FIG. 4, a lid 21 is secured to the top cover 13, body 9, and bottom cover 14, such as by screws 17, which are threaded through bolt holes 8. It will be appreciated by those skilled in the art that the lid 21 can be secured to top cover 13 by other securing means, such as bolts, nuts, glue, adhesives, resins, clamps, and so forth. As shown in FIG. 3, said lid 21 has a substantially spherically-contoured, concave lower surface 23. As a fluid passes in the direction of the arrows shown in FIG. 4 through the dampening and degassing chamber 3, and the dampening membrane 11 responds to increases in fluid pressure, the dampening membrane 11 will extend upward and may fill the space between the membrane 11 and the spherically-contoured lower surface 23 of the lid 21. Said lid 21 also may include at least one vent hole 22, which allows for air to escape as the membrane 11 expands. In the embodiment shown in FIG. 4, for example, multiple vent holes 22 may be used, since a single vent hole 22 may be occluded by an upwardly extended dampening membrane 11 (and, hence, may prevent air from escaping).

In the embodiment shown in FIG. 4, for example, a port 24 is connected to an air channel 25 and is located below the degassing membrane 12 and the support structure 16. Said port 24 and air channel 25 facilitate degassing and de-bubbling of a fluid by allowing for entrained gases in the fluid that pass through the degassing membrane 12 to escape the device 50. A vacuum pump, for example (not shown in FIG. 4), if desired may be attached to said port 24 and air channel 25 to help remove gases from the degassing membrane 12.

It will be appreciated that the device 50 may be configured in ways other than the configurations illustrated in FIGS. 1-5. In one embodiment, for example, a pump (not shown) may be attached to the fluid input port 1, so as to help increase the pressure differential such as may be useful to more quickly achieve degassing and/or de-bubbling of a fluid. In another embodiment, a vacuum may be attached to the fluid output port 5 to perform the same function. In another embodiment, the fluid channels 2, 4 may be angled relative to the horizontal plane of the device 50. In other embodiments, the lid 21, top block 13, body 9, and bottom block 14 may be joined by clips, clamps, glue, other adhesives, or a heat-sealable plastic instead of by screws 17 threaded through bolt holes 8. Another alternative embodiment of the present disclosure includes the use of the device 50 with a membrane 12 selected to allow a gas to be introduced into the fluid moving through the device 50, instead of allowing for the removal of a gas from the fluid. In such an embodiment, a pump and/or vacuum could be used to create a pressure differential designed to push or force a gas through a permeable membrane chosen to allow the gas to pass through it and into the fluid.

Although not shown, those skilled in the art will appreciate that the device 50 can be used with a restrictive element to help generate back-pressure. For example, a restrictive element may be connected to the port 5 of device 50 so that back-pressure increases as the flow rate of a fluid through the device 50 increases. A restrictive element can be provided by a small orifice, a long tube with a relatively small inner diameter through which the fluid passes, or any other device that provides increasing back-pressure when the flow rate of the fluid moving through the restrictive element increases.

Pulse dampeners and degassers and/or de-bubblers in accordance with the present disclosure can be used in a wide variety of applications. For example, the devices of the present disclosure can be used in systems like an analytical instrument system (e.g., liquid or gas chromatography, ion chromatography, mass spectrometry, micro chromatography, biochemical detection, biological sensing, drug discovery, drug delivery, molecular separation, proteomics, optofluidics, and the like), in vitro diagnostic systems including systems that do testing or analysis of blood, urine, DNA or the like, in systems used for other medical and healthcare applications, and in systems used in industrial applications, such as those in which food products, potable liquids (e.g., milk, water, soft drinks, alcoholic beverages, orange juice, lemonade, and other drinks), air, other liquids, or other fluids are pumped and/or tested. Those skilled in the art will appreciate that pulse dampeners of the present disclosure may be used in still other applications.

Although it will be apparent that the embodiments of the present disclosure can be used in a wide variety of situations, the following are some specific details regarding potential applications. For example, a device having a restrictive element that provides a hydraulic resistance of about 25 pounds per square inch per milliliter per minute of water, may be used for applications in which the fluid is under a pressure of from 0 to 100 pounds per square inch or so, and the fluid flows at a flow rate in the range of 0 to 1000 microliters per minute or so. In such an application, the device 50 in accordance with one of the embodiments of the present disclosure could typically have an allowed pulse size of from 0 to 50 microliters or so, and have a liquid volume in the chamber 3 of from 100 to 1000 microliters or so. Such a device 50 would reduce the amplitude of the pulses by from 10% to 95% or so, depending upon the dampening membrane thickness, area, and durometer. The same device would be expected to enable 200 microliters of air to be purged from the chamber 3, in from one to ten minutes, depending on the area and efficiency of the degassing membrane, and the pressure difference between the inner and outer sides of the degassing membrane. As noted, this is just one example of a specific embodiment; the present disclosure is expected to find use in a wide variety of applications and situations, not just those with these particular pressure, flow rate, and size specifications.

Those skilled in the art will also appreciate that different applications often use different types of pumping mechanisms, and the pulse dampener and degasser and/or de-bubbler device 50 like that shown and disclosed herein can be used with different types of pumping mechanisms. For example, conventional peristaltic and piston pumps often are used in systems to pump a fluid through the system. Such conventional peristaltic and piston pumps can generate unwanted fluctuations in the pressure of the fluid as it flows from the pump. Accordingly, a device 50 of the present disclosure can be successfully used in connection with pumps which may generate pressure fluctuations, including peristaltic and piston pumps, as well as other positive displacement pumps such as gear, membrane, screw, syringe, diaphragm, and impeller, pumps. While other types of pumps, such as pressure-driven and electroosmotic pumps tend to be less pulsatile, the present invention might certainly be used with such pumps as well, to reduce or eliminate any residual pulsations that might be present on their outputs.

Those skilled in the art will also appreciate that pulse dampeners and degassers and/or de-bubbler devices like those shown and described above can vary as to size, shape, and dimensions, and can vary as to the materials used for the various components and features as may be desired for one or more anticipated applications. For example, the chamber may be circular, elliptical, or shaped like an eye or a cylindrical shape as shown in FIGS. 5A, 5B, and 5C, or may have some other shape as may be desired for a given application for which the device is intended. In addition, any or all of these shapes may be used with a hemispherical shape of the dampening chamber 3 as shown in FIG. 4 or some other shape as may be desired for a particular intended application of the device. In addition, those skilled in the art will appreciate that the devices disclosed herein shown can be easily adapted for orientations different than those shown and described above for a given intended application if so desired. Thus, references herein to terms such as "top," "bottom, "right," "left," "above," "below," and the like are merely used for convenience with respect to the illustrations in the figures and are not limiting of the scope of the invention.

Those skilled in the art will further appreciate that the pulse dampener and degasser and/or de-bubbler device of the present disclosure has a number of advantages. The device 50 of the present disclosure does not require complex mechanical or electrical systems as part of a feedback or control mechanism for dampening pulses, nor does it require complex mechanical or electrical systems or components for degassing or de-bubbling functions. Thus, the device 50 of the present disclosure can be manufactured more easily and more cheaply and is believed to be more durable and easier to maintain. In addition, the device 50 of the present disclosure has only one chamber that must be filled with liquid, and hence minimizes the volume of liquid that must be used to prime the device, relative to conventional approaches, which require separate dampeners and degassers. The invention achieves this, while still providing excellent dampening and degassing and/or de-bubbling characteristics across a wide range of pressures and flow rates. These advantages and still others will be apparent to those skilled in the art in view of the embodiments shown and described in this disclosure.

The foregoing detailed descriptions and disclosure are only illustrative and by way of examples. Those skilled in the art will appreciate that the foregoing embodiments can be changed and arranged in different ways, and can be implemented in a variety of ways, all without going beyond the scope and spirit of the invention which is set forth in the claims below. Those skilled in the art will also appreciate that various types of components, such as for example, may be used as may be desired. In addition, while the foregoing disclosure has focused on a particular type of device as an example, those skilled in the art will appreciate that the systems and methods described herein will find useful application in a variety of fields in which the present disclosure may be useful. Thus, it will be appreciated that the foregoing descriptions and the figures are illustrative only, and not limiting.

We claim:

1. A device comprising:
a body having a first side and a second side, wherein the first side has a first port and the second side has a second port, and wherein said body has a chamber therein, wherein the chamber is in fluid communication with the first port and the second port;
a dampening membrane, wherein at least a first portion of said dampening membrane defines a top portion of the chamber in said body and at least a second portion of said dampening membrane is sealingly secured to said body;
a degassing membrane, wherein at least a first portion of said degassing membrane defines a bottom portion of the chamber in said body and at least a second portion of said degassing membrane is sealingly secured to said body; and
a lid located within a cavity in said body above at least a portion of said dampening membrane, wherein said lid comprises a spherically-shaped lower surface portion facing a portion of said dampening membrane.

2. The device according to claim 1 wherein the chamber, when viewed from the top, has a substantially circular or oval shape.

3. The device according to claim 1 wherein the chamber when viewed from the top, is substantially eye-shaped.

4. The device according to claim 1 wherein said body comprises a thermoplastic material.

5. The device according to claim 1 wherein said body comprises a metal.

6. The device according to claim 1 wherein said body comprises a ceramic.

7. The device according to claim 1 wherein said dampening membrane comprises a material selected from the group consisting of: silicone rubber, fluoropolymer elastomer, perfluoroelastomer, biocompatible materials, polyurethane, rubber, neoprene, ethylene propylene diene monomer rubber, and combinations thereof.

8. The device according to claim 1 wherein said degassing membrane comprises a substantially non-porous material.

9. The device according to claim 1 wherein said degassing membrane comprises a substantially porous material.

10. The device according the claim 1 wherein said degassing membrane comprises a material selected from the group consisting of: silicone rubber, polytetrafluoroethylene, fibrillated polymers, and combinations thereof.

11. The device according to claim 1 further comprising a porous support, wherein at least a portion of said support is located between said degassing membrane and a bottom side of said body.

12. The device according to claim 1 wherein said body further comprises a top body portion and a bottom body portion, and wherein said top body portion and said bottom body portion are secured together.

13. The device according to claim 1 wherein said lid comprises at least one vent providing fluid communication between the cavity above said dampening membrane and an exterior portion of said body.

14. The device according to claim 1 wherein both said dampening and said degassing membrane maintain a sealed connection to said body when the pressure of a fluid in the chamber is less than or equal to 100 psi.

15. The device according to claim 1 further comprising a plurality of mounting holes in said body.

16. A device comprising:
a body having a first side and a second side, wherein the first side has a first port and the second side has a second port, and wherein said body has a chamber therein, wherein the chamber is in fluid communication with the first port and the second port;
a dampening membrane comprising a first material, wherein at least a first portion of said dampening membrane defines a top portion of the chamber in said body and at least a second portion of said dampening membrane is sealingly secured to said body; and a de-bubbling or degassing membrane comprising a second material, wherein the second material is different from the first material, wherein at least a first portion of said de-bubbling membrane defines a bottom portion of the chamber in said body and at least a second portion of said de-bubbling membrane is sealingly secured to said body.

17. The device according to claim 16 wherein said de-bubbling membrane comprises a material selected from the group consisting of: polytetrafluoroethylene, TEFLON, fibrillated polypropylene, and combinations thereof.

18. A device comprising:

a body having a first side and a second side, wherein the first side has a first port and the second side has a second port, and wherein said body has a chamber therein, wherein the chamber is in fluid communication with the first port and the second port;

a dampening membrane, wherein at least a first portion of said dampening membrane defines a top portion of the chamber in said body and at least a second portion of said dampening membrane is sealingly secured to said body; and a degassing or de-bubbling membrane, wherein at least a first portion of said degassing or de-bubbling membrane defines a bottom portion of the chamber in said body and at least a second portion of said degassing or de-bubbling membrane is sealingly secured to said body.

* * * * *